US006152195A

United States Patent [19]
Persenaire

[11] Patent Number: 6,152,195
[45] Date of Patent: Nov. 28, 2000

[54] FILLING MACHINE REMOVABLE VALVE (BARB-LOC)

[75] Inventor: Jeffrey M. Persenaire, Hudsonville, Mich.

[73] Assignee: Fogg Filler Company, Holland, Mich.

[21] Appl. No.: 09/409,021

[22] Filed: Sep. 29, 1999

[51] Int. Cl.[7] .......................... F16K 43/00; F16K 51/00; B65B 1/04; B65D 5/72; F16L 37/00

[52] U.S. Cl. .......................... 141/149; 222/569; 251/156; 251/904; 137/315.27; 137/315.41; 285/305; 141/144; 141/148

[58] Field of Search .................................... 222/566, 569, 222/567, 494; 251/156, 904; 137/315.07, 315.11, 315.27, 315.41; 141/144, 146–149, 388; 285/305, 308

[56] References Cited

U.S. PATENT DOCUMENTS

| | | | |
|---|---|---|---|
| 2,784,885 | 3/1957 | Kneisley | 222/139 |
| 3,172,436 | 3/1965 | Wilhere et al | 141/146 |
| 3,176,731 | 4/1965 | Minard | 141/295 |
| 3,756,290 | 9/1973 | Cleland | 141/5 |
| 4,700,746 | 10/1987 | Minard | 141/144 |
| 5,067,754 | 11/1991 | Bartholomew | 285/308 |
| 5,080,147 | 1/1992 | Millet et al. | 141/147 |
| 5,085,354 | 2/1992 | Sogliani et al. | 222/504 |
| 5,782,508 | 7/1998 | Bartholomew | 285/305 |
| 5,975,159 | 11/1999 | Persenaire et al. | 141/145 |
| 5,988,706 | 11/1999 | Hollnagel | 285/305 |

OTHER PUBLICATIONS

Bulletin No. 45, The Fogg Ventraflo Valve.

*Primary Examiner*—Kevin Shaver
*Assistant Examiner*—D A Bonderer
*Attorney, Agent, or Firm*—Price, Heneveld, Cooper, DeWitt & Litton

[57] ABSTRACT

A container filling machine and removable valve assembly having a liquid retention bowl and at least one filler valve assembly depending therefrom, the bowl having at least one bottom opening, a periphery around the opening, and a shoulder at the periphery, the filler valve assembly extending through the opening and including an upwardly protruding vent tube in the bowl, a valve retention clip on the vent tube and having at least one abutment within the bowl aligned with the shoulder to be engageable with the shoulder to prevent unwanted valve removal from the bowl, the retention clip being accessible from outside the bowl and having sufficient resilient flexibility to move the at least one abutment away from the shoulder for release of the filler valve assembly from the bowl.

10 Claims, 4 Drawing Sheets

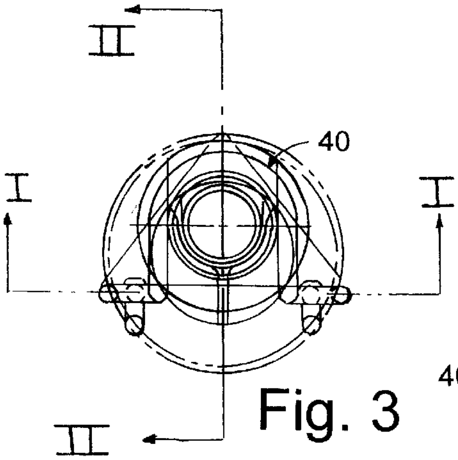
Fig. 3
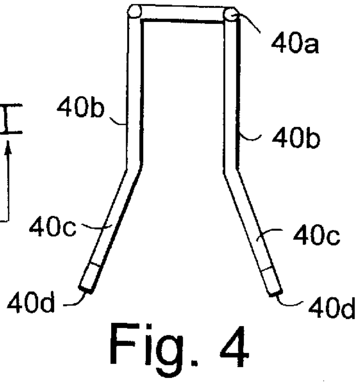
Fig. 4
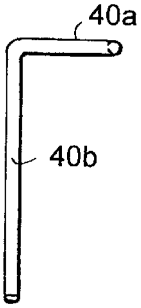
Fig. 5
Fig. 12
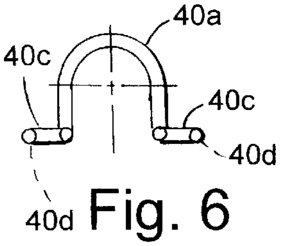
Fig. 6
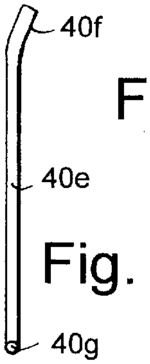
Fig. 7
Fig. 8
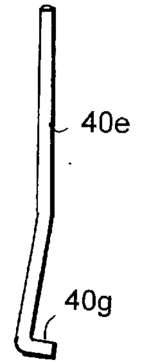
Fig. 9
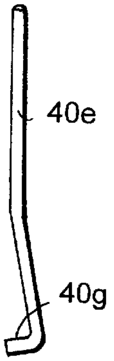
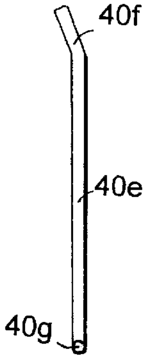
Fig. 10
Fig. 11
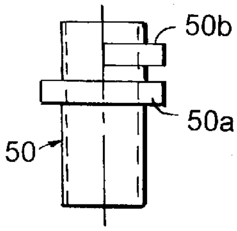
Fig. 13
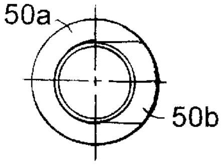
Fig. 14
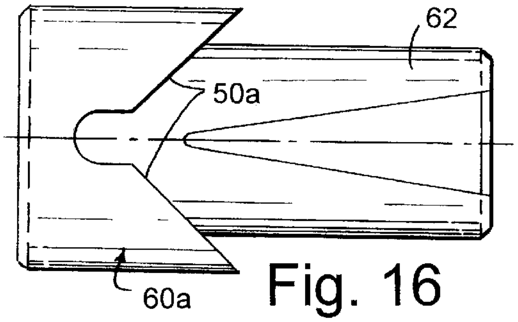
Fig. 16
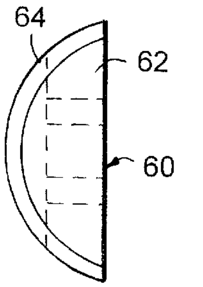
Fig. 17
Fig. 18
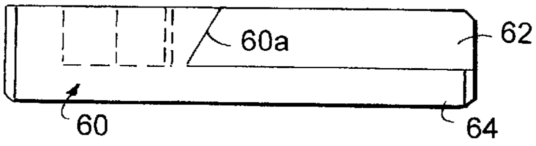

FILLING MACHINE REMOVABLE VALVE (BARB-LOC)

BACKGROUND OF THE INVENTION

This invention relates to container filling machines, and particularly to a removable valve for container filling machines.

Container filling machines typically include a bowl having a plurality of filler valves depending below the bowl for engaging and filling containers such as bottles with a liquid. Milk is one common liquid beverage with which filling machines are employed. Procedures for maintaining sanitation in milk filling machines are particularly sensitive. If the plane of the top opening of the filling machine is broken, sterility of the whole filling operation is jeopardized and a complete system washdown must occur. This is costly and time consuming. In most typical filling machines, if a valve is to be removed and/or replaced, breaking of this top seal is required since the operator must access the interior bottom of the bowl in order to release the valve from the bowl.

One alternative assembly enabling external valve release is set forth in pending U.S. patent application Ser. No. 08/926,351, filed Sep. 9, 1997, and entitled Container Filler Apparatus External Disconnect Valve.

SUMMARY OF THE INVENTION

An object of this present invention is to provide a novel filling machine removable valve, and combination filling machine and removable valve, that has an internal retainer but enables the valve to be removed and/or replaced from the exterior, without losing sterility of the filling machine. Specifically, the valve for diaphragm-style container filling machines is externally removable and replaceable by externally releasing the internal retainer without having to enter the bowl, so that the plane of the top seal is not broken to thereby require complete machine washdown. This, therefore, lessens or eliminates effects of potential bacterial contamination.

Another object of the invention is to provide a novel, externally removable filling machine valve capable of even being retrofitted to existing filling machines, making it easier and less costly than replacing the complete bowl assembly or the whole filling machine.

The filling machine valve has a retention clip inside the bowl flange but releasable from outside the bowl by deflecting flexible, resilient legs of the clip to move clip abutments away from a peripheral shoulder of the valve-receiving orifice, and thereby allow valve removal from the outside of the machine.

These and other features, objects and advantages of the invention will become apparent upon studying the following disclosure in conjunction with the drawings.

BRIEF DESCRIPTION OF THE DRAWINGS

FIG. 3 is a plan view of the valve assembly;

FIG. 4 is an elevational view of the retention portion of the retention clip;

FIG. 5 is a side elevational view of the clip portion in FIG. 4;

FIG. 6 is a top plan view of the clip portion in FIG. 4;

FIG. 7 is a side elevational view of one lower actuator leg portion of the retention clip;

FIG. 8 is a top plan view of the one lower actuator leg portion in FIG. 7;

FIG. 9 is a side elevational view of the leg portion in FIG. 7, viewed from the right of FIG. 7;

FIG. 10 is a side elevational view of the opposite lower actuator leg portion to that in FIGS. 7–9;

FIG. 11 is a top plan view of the clip leg portion in FIG. 10;

FIG. 12 is a side elevational view of the clip leg portion in FIG. 10, viewed from the right of FIG. 10;

FIG. 13 is a side elevational view of a clip-retention ring which is to be located on the vent tube;

FIG. 14 is a top plan view of the clip-retention ring;

FIG. 16 is a plan view of an optional tool for releasing the retention clip;

FIG. 17 is an end elevational view of the tool in FIG. 16; and

FIG. 18 is a side elevational view of the tool in FIGS. 16 and 17.

DESCRIPTION OF THE PREFERRED EMBODIMENT

Figure 2:
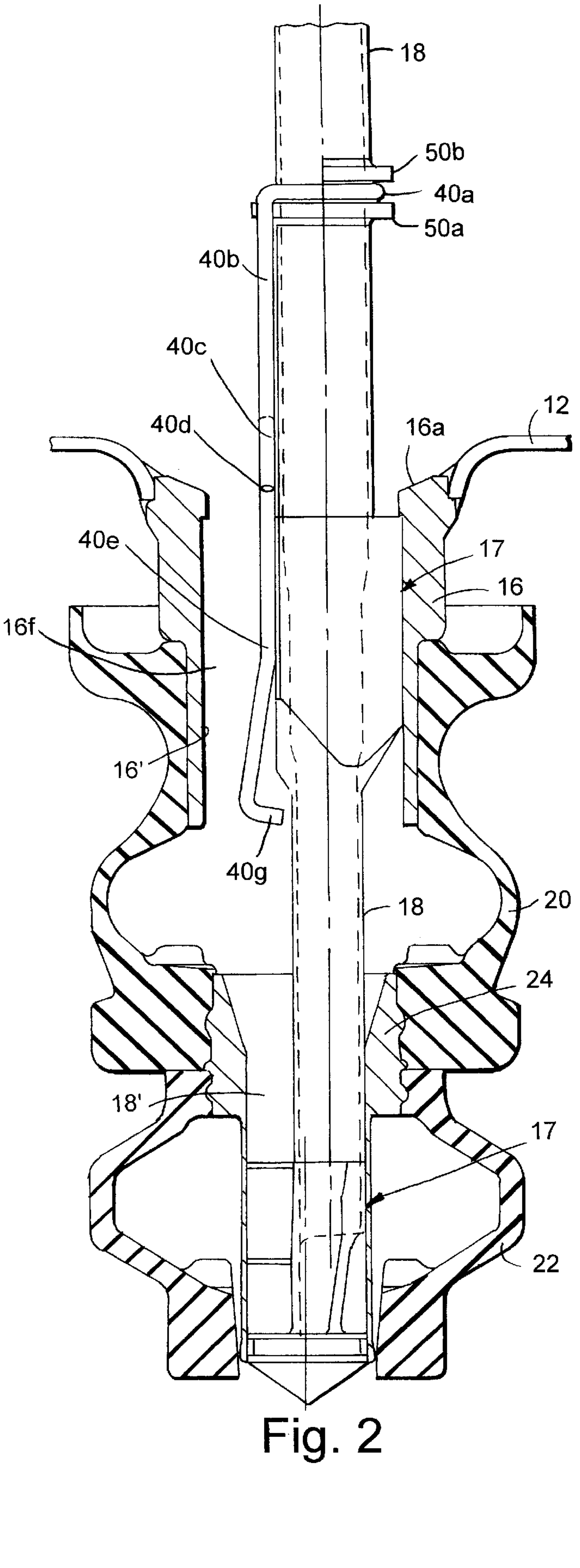
FIG. 2 is an elevational sectional view of the assembly in FIG. 1 taken from the right side thereof, i.e., taken on plane II—II of FIG. 3.
Figure 15:
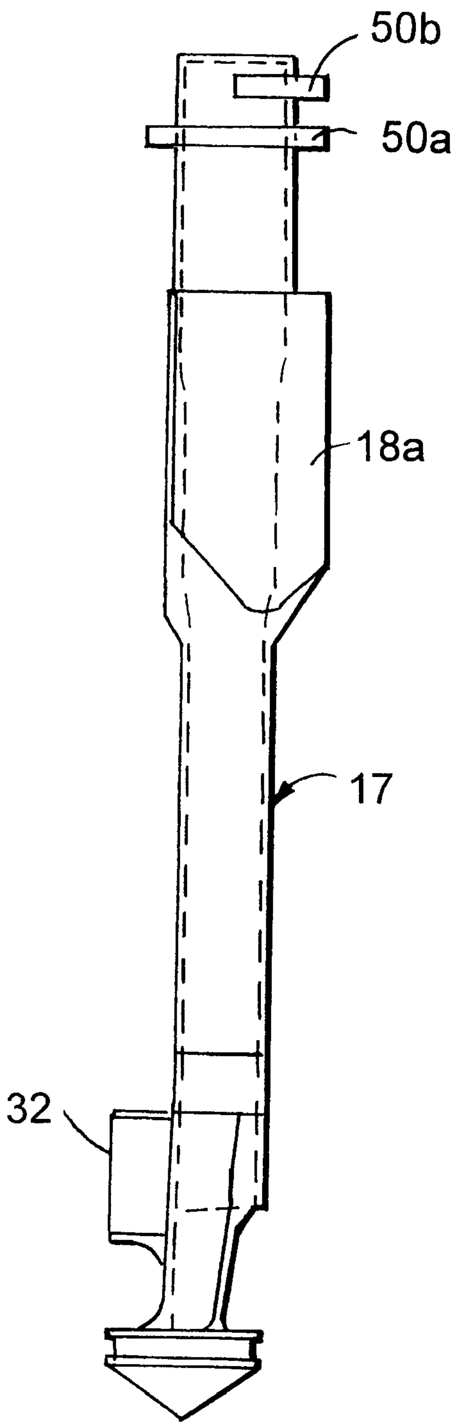
FIG. 15 is an elevational view of the filler valve vent tube and valve in FIGS. 1 and 2.

The container filling machine 10 includes a liquid retention bowl 12 shown in fragmentary form, of conventional type, having a plurality of filler valve assemblies 14 depending therefrom. Each valve is affiliated with an opening 12' in the bottom of bowl 12 and into which a conventional cylindrical spud 16 is attached. This spud includes a central opening 16' in which a vent tube and valve assembly 17 is mounted. The vent tube 18 is inserted up into the bowl when the valve vent tube and valve assembly is mounted to the bowl. As depicted in the drawings, the filler valve here shown includes two diaphragms, namely an upper diaphragm 20 and a lower diaphragm 22, both attached to a stainless steel mounting collar or ring 24. Collar 24 extends around and is spaced from vent tube 18 around a portion of tube 18 to form a fluid flow passage 18' therebetween. Both diaphragms have an annular, axially compressible outwardly convex ring. These conventional diaphragms are formed of a resilient, flexible polymer such as silicone rubber. The diaphragms are attached to stainless steel sleeve 24 by a rib and groove connection of conventional type. Upper diaphragm 20 preferably has a condensation trough 20' of conventional type, for discharge of condensation away from diaphragms 20 and 22. Upper diaphragm 20 defines an annular fluid chamber 26. Lower diaphragm 22 defines an annular fluid chamber 28. The lower end of diaphragm 22 engages the depending annular skirt **24*a* of sleeve 24. Skirt 24*a* engages an O-ring 30 retained in an annular groove around the lower end of valve head 32. Valve 32 is mounted at the lower end of vent tube 18. Located within spud or collar 16 is an enlarged valve housing 18*a* interfitting within opening 16' so as to engage an arcuate portion of the interior wall of spud 16 (FIG. 2), but spaced from the remaining arcuate portion of spud 16 to provide a fluid flow passage 16*f* (FIG. 2**).

Figure 1:
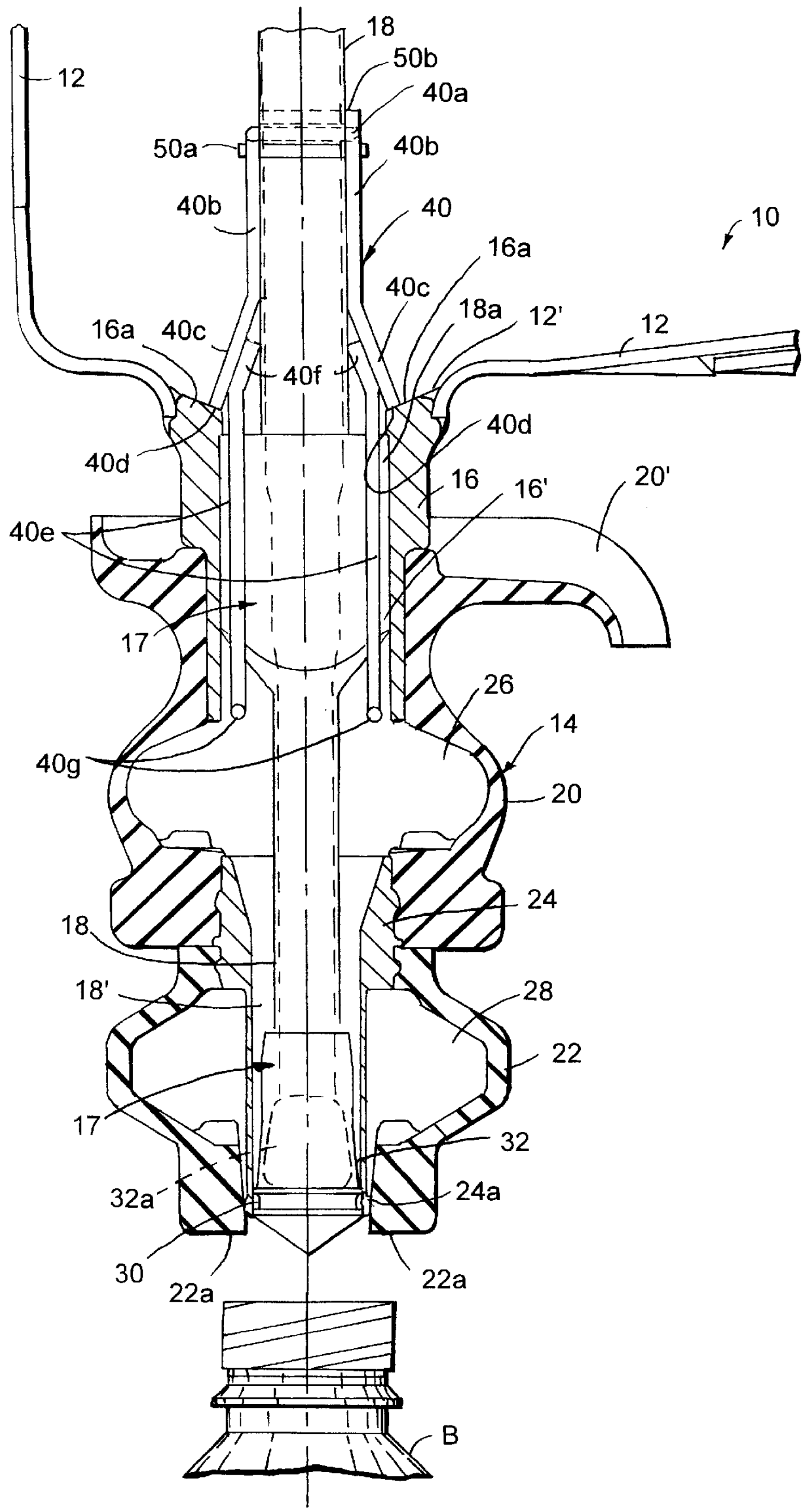
FIG. 1 is a side elevational sectional view of a filling machine bowl and valve assembly according to the invention, taken on plane I—I of FIG. 3.

The valve assembly is retained in position within spud 16 of bowl 12 by a novel retainer clip 40. This clip is formed into an integral piece from two segments, i.e., preferably formed from an upper, shaped rod or wire having a semi-circular transverse upper end 40*a*, a pair of downwardly extending legs 40*b* which diverge outwardly at their lower ends 40*c* to end in an abutment surface 40*d* adapted to engage the upwardly-radially inwardly sloped, upper annular shoulder 16*a* on the spud or collar 16. Attached to the inner surfaces of leg portions 40*c* is a pair of lower legs 40*e*, and specifically the upper, inwardly tapered portions 40*f* thereof, as by weldment. The lower ends of legs 40*e* extend down toward the lower end of spud 16 so as to be accessible when diaphragms 20 and 22 are removed from the valve assembly. Semi-circular upper end 40*a* is held in place between annular ring 50*a* and ring segment 50*b* of sleeve 50 secured in position on the upper portion of vent tube 18, i.e., so as to be located within bowl 12. Retainer clip 40, by engagement of its abutments 40*d* with shoulder 16*a*, secures the valve in place relative to bowl 12. The plurality of like retainer clips on the plurality of like valves, each of which appears like the one in FIGS. 1 and 2, prevent the valves from withdrawal from the bowl until desired.

In normal operation of the valve, containers such as representative bottle B are filled by causing vertical movement of the container upper open end up against the bottom annular surface 22*a* of diaphragm 22, forcing the diaphragm upwardly so that fluid such as milk in bowl 12 can flow down around the valve assembly, successively into and through chambers 26 and 28 and thence past valve head 32 and into bottle B through O-ring 30 into the bottle. When the bottle is withdrawn downwardly, any excess fluid or foam in the bottle will be withdrawn up through side orifice 32*a* in typical fashion.

To remove the valve assembly from the bowl, diaphragms 22 and 20 are removed from the bottom of spud 16 by pulling them down off their shoulder and groove engagement with sleeve 24, to thereby expose the lower ends 40*g* of legs 40*e*. By pressing these legs 40*e* toward each other, this deflects the upper ends 40*f* and thus attached divergent legs 40*c* radially inwardly away by deflecting resilient leg segments 40*b* to shift abutments 40*d* away from shoulder 16*a*, enabling the valve assembly to be drawn down outwardly of the bowl. Instead of pressing legs 40*e* manually, a tool such as that shown in FIGS. 16, 17 and 18 can be employed. This tool 60 has a narrower chordal portion 62 which is arcuately convex on its outer surface 64 (FIG. 17), so as to be inserted up alongside the valve assembly into the opening 16*a* (FIG. 2) adjacent legs 40*e* for engagement with the lower ends 40*g*. Specifically, tool 60 has a pair of convergent faces 60*a* for engaging the opposite lower ends 40*g* of legs 40*e* and pressing them together so as to release abutments 40*d* from annular shoulder 16*a* and allow subsequent removal of the valve. If a valve needs to be removed and replaced, it can be done without breaking the top seal of the bowl, thereby not necessitating complete shutdown and washdown of the machine. When the valve is replaced by inserting it and allowing abutments 40*d* to engage shoulder 16*a*, the rubber diaphragms 20 and 22 are reattached to the spud by pressing them on, to be ready for further operation.

Conceivably, instead of a double diaphragm being used as here shown for bottling milk, a single diaphragm unit could be employed, of the type conventionally used for beverages other than milk. The present invention does not depend on a particular type of diaphragm.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. A container filling machine and removable valve assembly, comprising:

a liquid retention bowl and at least one filler valve assembly depending therefrom;

said bowl having at least one bottom opening, a periphery around said opening, and a shoulder at said periphery;

said filler valve assembly extending through said opening and including an upwardly protruding vent tube in said bowl;

a valve retention clip on said vent tube and having at least one abutment within said bowl aligned with said shoulder to be engageable with said shoulder to prevent unwanted valve removal from said bowl, said retention clip being accessible from outside said bowl and having sufficient resilient flexibility to move said at least one abutment away from said shoulder for release of said filler valve assembly from said bowl.

2. The container filling machine and removable valve assembly in claim 1 wherein said valve retention clip has a pair of abutments aligned with said shoulder inside said bowl.

3. The container filling machine and removable valve assembly in claim 2 wherein said valve assembly has at least one removable external diaphragm allowing access to said valve retention clip from outside said bowl.

4. The container filling machine and removable valve assembly in claim 2 wherein said valve retention clip has depending legs extending downwardly from said abutments sufficiently to be accessible from outside said bowl, said legs being movable relative to said bowl for moving said pair of abutments away from said shoulder.

5. The container filling machine and removable valve assembly in claim 4 wherein said legs are movable toward each other.

6. A container filling machine removable valve assembly for removal from a bowl in a filling machine, comprising:

a filler valve assembly including an upwardly protruding vent tube;

a valve retention clip on said vent tube and having at least one abutment to be aligned with an orifice shoulder in a filling machine to be engageable with the shoulder, said retention clip being accessible from outside said bowl and having sufficient resilient flexibility for release of said filler valve assembly from the bowl.

7. The removable valve assembly in claim 6 wherein said valve retention clip has a pair of abutments aligned with said shoulder inside said bowl.

8. The removable valve assembly in claim 7 wherein said valve assembly has at least one removable external diaphragm allowing access to said valve retention clip.

9. The removable valve assembly in claim 7 wherein said valve retention clip has depending legs extending downwardly from said abutments, said legs being movable relative to said bowl for moving said pair of abutments.

10. The removable valve assembly in claim 9 wherein said legs are movable toward each other.

* * * * *